April 25, 1961 R. A. CONLY 2,981,805

MAGNETIC TAPE APPARATUS

Filed Dec. 16, 1957

INVENTOR.
Ralph A. Conly

BY Flehr & Swain

ATTORNEYS 2,981,805
Patented Apr. 25, 1961

2,981,805

MAGNETIC TAPE APPARATUS

Ralph A. Conly, Sunnyvale, Calif., assignor to Ampex Corporation, Redwood City, Calif., a corporation of California Filed Dec. 16, 1957, Ser. No. 703,002

5 Claims. (Cl. 179—100.2)

This invention relates generally to apparatus capable of recording signal intelligence magnetically on a magnetic tape. More particularly it pertains to machines of this type in which a record track is engaged by adjacent magnetic record and playback (e.g. monitor) heads.

Magnetic tape machines commonly employ transport means whereby the magnetic tape is drawn at a constant speed across a magnetic head assembly. Machines intended for pulse recording, as for example for instrumentation or data recording purposes, frequently employ closely adjacent record and playback or monitor heads, thereby enabling continuous monitoring of the recorded magnetic pattern. A typical machine of this type employs multitrack heads, thereby permitting recording on a plurality of tracks or channels extending longitudinally of the tape. One difficulty which has been experienced with such machines is so-called "crosstalk" between the record and playback heads. Cross talk is apt to be particularly troublesome when recording fast rise time pulses. It is caused by leakage flux from the record head, which results in magnetic coupling between the record and monitor heads. It is possible to prevent such cross talk by providing each of the heads with magnetic shielding extending completely about the same. However, such individual shielding, when effectively applied, considerably increases the cost of manufacture, and in general it unduly complicates the assembly.

In general, it is an object of the present invention to provide a magnetic tape machine having novel means for preventing cross talk between closely adjacent record and playback heads.

Another object of the invention is to provide a machine of the above character which can be satisfactorily applied to the recording of fast rise time pulses without cross talk effects.

Another object of the invention is to provide a machine in which the means serving to prevent cross talk is relatively simple and effective, and does not involve extensive individual magnetic shielding of the record and playback heads.

Additional objects and features of the invention will appear from the following description in which the preferred embodiments have been set forth in detail in conjunction with the accompanying drawing.

Referring to the drawing.

Figure 1:
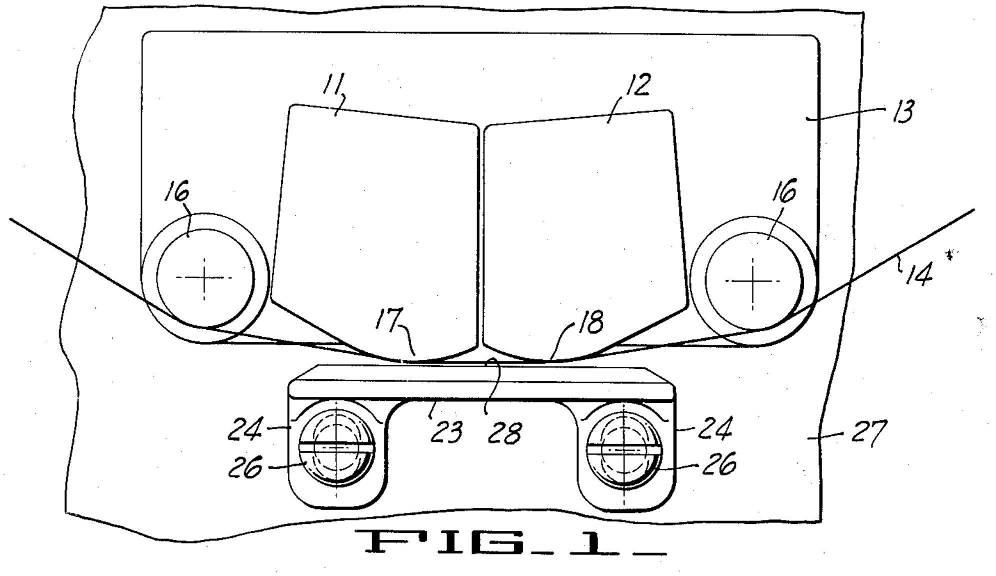
Figure 1 is a plan view illustrating a magnetic head assembly together with shielding means incorporating the present invention.

The assembly illustrated in the drawing consists of the record and playback heads 11 and 12, mounted upon the common base 13. Magnetic tape 14 is shown engaging the guides 16, which may be rollers or studs, and that portion of the tensioned tape between these guides engages the operating faces 17 and 18 of the heads.

Figure 2:
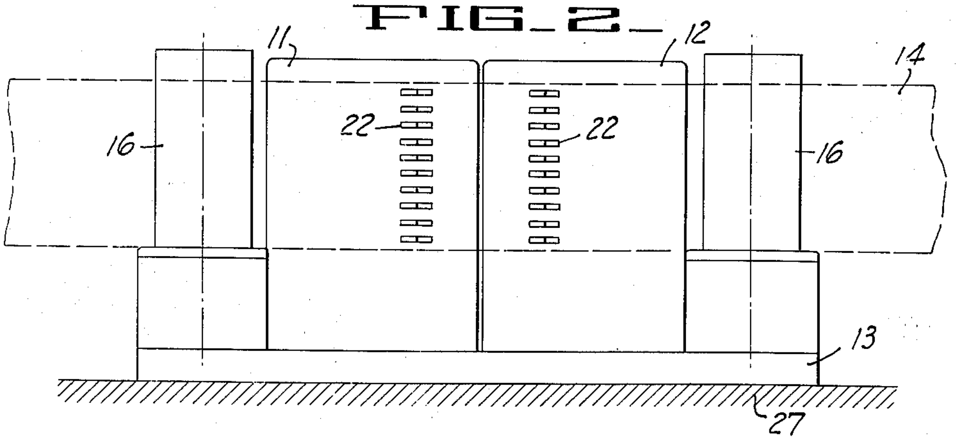
Figure 2 is a front view of the head assembly shown in Figure 1.

The heads in this instance are of the multitrack type. In other words, each head consists of a plurality of transducing units, with each unit comprising a magnetic core having pole tips separated by a thin non-magnetic gap, and a coil surrounding the core. The magnetic tips are indicated at 21 and 22 in Figure 2, and are exposed within the faces 17 and 18, for contact with the magnetic tape. These tips, and the other parts of the transducing units, may be contained within a body of synthetic resin. Suitable electrostatic and electromagnetic shielding can be provided between adjacent units. The pole tips for the two heads are disposed in alignment whereby the tips of the playback head operate on the same tracks as the tips for the record head.

Assuming the use of typical tape transport means, the tape is wound upon tape supply and takeup reels, which in turn are mounted upon suitable turntables. In addition the tape is engaged by capstan means whereby it is driven at a constant rate past the head assembly. Proper tape tension is maintained whereby the tape is at all times urged into engagement with the operating faces 17 and 18.

Figure 3:
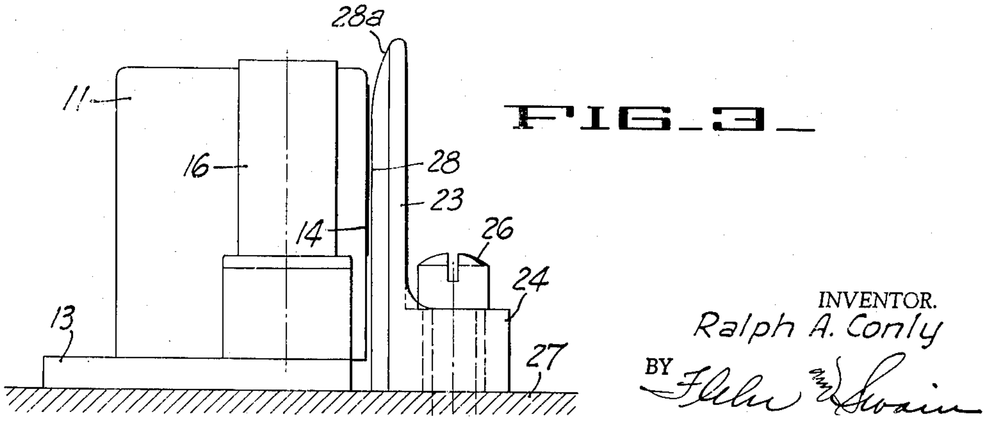
Figure 3 is an end view of the assembly shown in Figures 1 and 2.

With the arrangement described above some cross talk may be experienced between the record and playback heads, particularly when fast rise time pulses are being recorded. Such cross talk is the result of magnetic coupling between the transducer units of the heads, which in turn is caused by leakage flux. To prevent such cross talk I provide a shield 23, formed of nonmagnetic conductive material, such as copper, brass, or the like. Suitable means such as the slotted lugs 24 and the screws 26 serve adjustably to mount the shield on the supporting member or mounting panel 27, which also serves to support the base 13. The one face 28 of the shield is disposed in closely spaced proximity with the adjacent back side of the tape 14, in the manner illustrated in Figure 3. As shown particularly in Figures 1 and 2, the shield 23 extends in opposition to both the operating faces 17 and 18, and particularly in opposition to the regions occupied by the tips 21 and 22. Also as shown in Figure 3, it extends for the full width of the tape. The upper margin 28*a* of the surface 28 is shown filleted or beveled, to facilitate insertion and removal of the tape.

In a typical instance, where the tape has a width of, say, one inch, surface 28 may be disposed about 0.01 inch from the back side of the tape. In any event, it is positioned whereby it is in effective inductive relation with respect to the leakage flux from the record head tips.

The assembly described above operates as follows: Pulses applied to the transducer units of the record head tend to produce leakage flux with resulting magnetic coupling between the heads and cross talk as previously described. With the subject invention eddy currents are induced in the shield 23, in the region of the tips of the transducer unit being pulsed, and this has the effect of containing or localizing the leakage flux, with the result that inductive coupling with transducer units of the playback head is effectively reduced to a minimum. As a result cross talk effects are eliminated.

It will be evident from the foregoing that my invention provides a simple and effective means for preventing cross talk. It avoids the use of cumbersome and expensive magnetic shielding means surrounding the record and playback heads. It does not in any way interfere with or modify the functioning of other parts of the apparatus.

I claim:

1. In magnetic tape apparatus of the character described, a magnetic record head having a tape engaging face, said head including a magnetic transducing unit having pole tips of magnetic material forming a part of said face, a magnetic reproducing head disposed in proximity with said record head, said reproducing head likewise having a tape engaging face and including a record unit having pole tips of magnetic material forming a part of such face, means for guiding a magnetic tape for movement across said heads and with one side of the tape in contact with said tape engaging faces, the tips of the transducer units being positioned to contact the tape on a common track and in regions spaced in the direction of the length of the tape, and a stationary shield member formed of electrically conductive and nonmagnetic material disposed in close but spaced proximity with the other side of the tape, said shield extending in opposition to both said tape contacting regions, said shield member forming means serving to prevent cross talk between the record and reproducing heads.

2. Apparatus as in claim 1 in which said heads each include a plurality of transducer units and the shield member extends in opposition to all the magnetic tips of said units.

3. Apparatus as in claim 1 in which the mounting of the shield member with respect to the tape is adjustable.

4. In magnetic tape apparatus of the character described, a mounting base, magnetic record and monitor heads secured to said base in relatively close proximity with respect to each other, said heads having tape engaging faces, means for guiding magnetic tape whereby one side of the tape physically contacts the faces of both said heads in regions spaced in the direction of the length of the tape, the heads being engaged successively, as the tape is moved in one direction, each of said heads comprising a plurality of transducer units, the transducer units each having pole tips forming a part of the corresponding head face and adapted to contact the magnetic tape, the tips of the transducer units of the monitor head being aligned to operate upon the same tracks as the tips for the transducer units in the record head, a single stationary shield member of electrically conductive and nonmagnetic material, and means for mounting said shield member whereby one face of the same is in close but spaced relationship with the other side of the magnetic tape, said shield extending in opposition to the pole tips of both the record and monitor heads and serving to prevent cross talk between the same.

5. Apparatus as in claim 4 in which the mounting means for said shield is adjustable to thereby adjust the spacing betwen the shield and the tape.

References Cited in the file of this patent

UNITED STATES PATENTS

| | | |
|---|---|---|
| 2,175,388 | Gurley | Oct. 10, 1939 |
| 2,726,286 | Pettus | Dec. 6, 1955 |
| 2,761,911 | Camras | Sept. 4, 1956 |
| 2,786,897 | Schwarz | Mar. 26, 1957 |
| 2,810,020 | Schwarz et al. | Oct. 15, 1957 |